Patented July 31, 1951

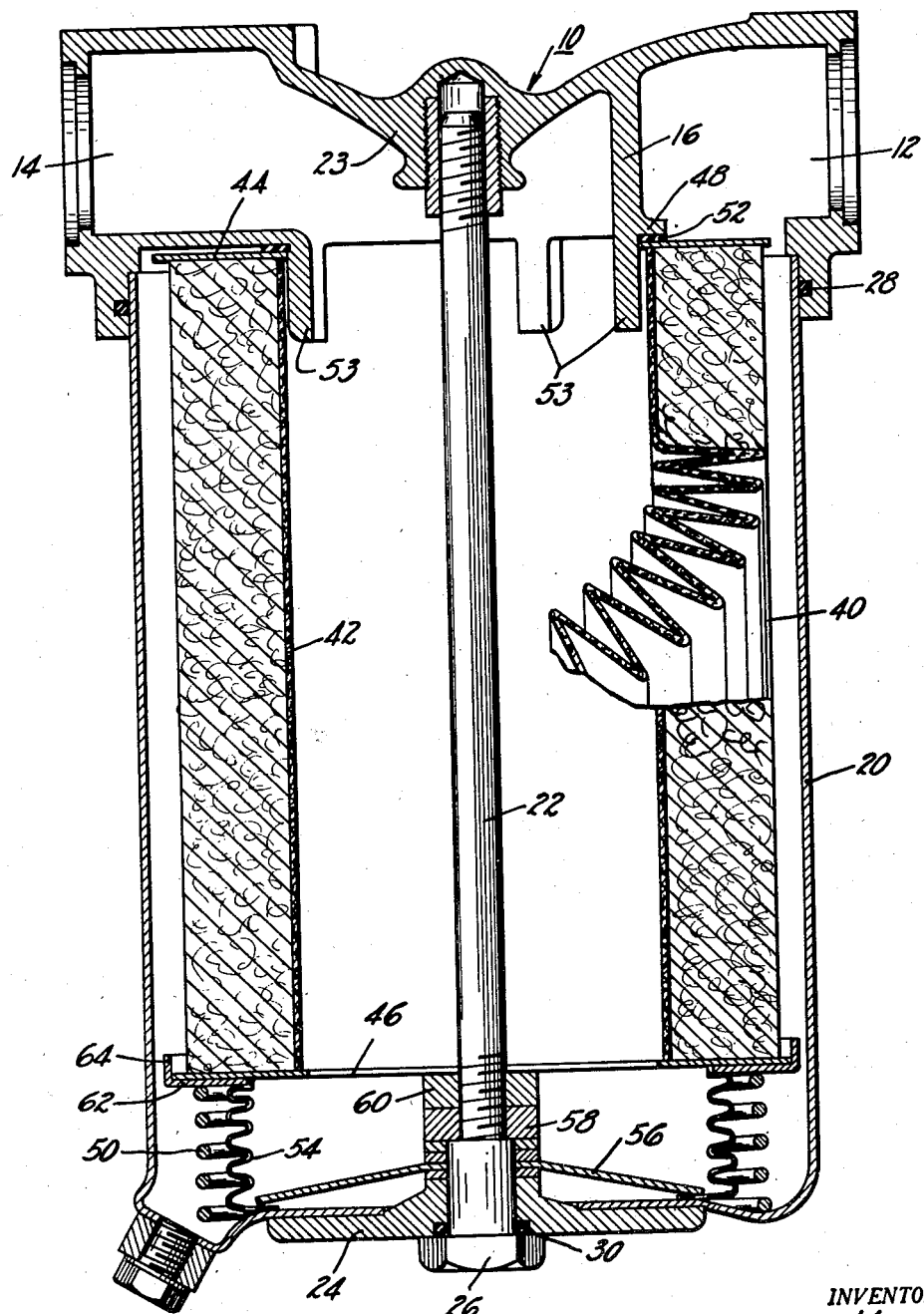

2,562,361

UNITED STATES PATENT OFFICE 2,562,361

FILTER

Walter Kasten, Detroit, Mich., assignor to Bendix Aviation Corporation, South Bend, Ind., a corporation of Delaware Application November 24, 1948, Serial No. 61,849

3 Claims. (Cl. 210—183)

The present invention relates to fluid purifying devices such as filters for removing foreign materials from lubricants, fuel oil, gasoline and the like, and more particularly to the aforesaid devices in which is provided a means for by-passing the fluid around the element in the event the latter becomes clogged or plugged with foreign materials.

It is one of the principal objects of the present invention to provide a fluid filtering deviice having an element in which the fluid flows from outside to inside and which is adapted to be displaced when said element becomes clogged with foreign materials, to permit the fluid to continue to flow through said device.

Another object of the invention is to provide a fluid purifying device having a relatively simple and easily serviced means for by-passing the fluid around the element when the latter becomes clogged, without carrying the sediment removed by the element on to the engine, machine, burner or the like.

Further objects and advantages of the present invention will become apparent from the following description and accompanying drawing wherein a vertical cross-section of my filtering device is shown with the several parts thereof assembled in operative relationship.

Referring more specifically to the drawing, numeral 10 designates a filter head in which are provided a fluid inlet passage 12, and a fluid outlet passage 14, said inlet and outlet passages being separated from one another in the filter head by a circular shaped wall 16 formed integrally with the internal portion of the head. The inlet and outlet passages are provided with an annular recess for receiving suitable fittings for installation of the filter in a fuel or lubricating line or the like. Suitable brackets (not shown), preferably formed integrally with the head, are provided for mounting the filter on an engine or other mechanism. A bowl 20 extends downwardly from the lower side of the head 10 and is secured in place by a stud 22 extending vertically through the center of the bowl and threadedly received at the upper end in a boss 23 in the central portion of head 10 and received at the lower end in a plate 24 held securely in place by a cap nut 26 threaded on to the end of said stud. Plate 24 is preferably joined integrally with the bottom of the bowl, though the two may be separate elements held in fluid-tight relationship by an interposed gasket. Gaskets 28 and 30 inserted in annular grooves in the head and plate, respectively, are provided for sealing the bowl to the head and the cap nut to plate 24 in fluid-tight relationship.

The filter element, generally designated by numeral 40, consists of vertically pleated side walls 42 of a resinous impregnated paper cemented at the top and bottom to annular plates 44 and 46, respectively, which rigidly hold said element in a cylindrical shape. The element seats on an annular flange 48 around the outside of wall 16 and is held in place by a coil spring 50 reacting between the bottom of the bowl 20 and the lower end of said element. A gasket 52 is preferably inserted between the filter element and said flange. Four finger-like members 53, which extend downwardly from the lower edge of wall 16, retain the filter element in alignment with annular flange 48 during the time the filter element is held unseated by the abnormally high differential in pressure across the element existing when said element is clogged or plugged with foreign material.

A circumferentially corrugated cylindrical member or bellows 54 having axial resiliency is interposed between the lower end of the filter element and the bottom of the bowl and is held in place against the bottom of the bowl by a conically-shaped plate 56 held rigidly in place against the marginal edge of said bellows by nut 26 and plate 24 on the lower side thereof and a nut 58 on the upper side, a second nut 60 preferably being used to prevent unintentional rotation of nut 58. Gaskets or washers may be inserted between plates 24 and 56 and between said latter plate and nut 58, as shown in the drawing. A flange 62 on the upper edge of bellows 54 is urged into close contact with plate 46 of the filter element by spring 50, and is provided with an annular upturned edge 64 to retain the filter element and bellows in proper alignment. By the use of the bellows as shown in the drawing, the surface area (the under side of flange 62) exposed to the pressure urging the filter element upwardly against its seat on flange 48 is made substantially smaller than the surface area (the top side of plate 44) exposed to the pressure urging the filter element downwardly away from said seat. The pressure required for unseating said element, therefore, is a function of the difference in area between the two surfaces and the force of spring 50 urging the filter element to its seated position on flange 48.

In the normal operation of the present filter, fluid enters inlet passage 12, passes downwardly into the bowl around the filter element 40, through the side walls of said element into the internal portion thereof and thence flows upwardly and passes out of the filtering device through outlet passage 14. As the filtering operation proceeds, there is usually a gradual accumulation of foreign matter on the surface of the filter element. As this foreign matter accumulates, the capacity of the filter decreases and the pressure differential across the filter element gradually rises. If the foreign matter is permitted to accumulate, the pressure differential across the filter element eventually will become sufficiently great to cause the filter element to move downwardly until the fluid can pass between the top of the element and the lower edge of wall 16, completely by-passing the element. Thus, the fluid continues to flow through the device even though the element becomes completely clogged with foreign material.

It is seen that the present arrangement incorporates the feature of filtering the fluid from outside to inside through the element to provide the greatest possible filter surface, and at the same time permits the filter element to be displaced for by-passing the fluid around said element when the latter becomes clogged. In the present construction, when the element is unseated to by-pass fluid around the element, the fluid does not flow or circulate to any substantial degree around the filter element on which the foreign material has accumulated. Thus, one of the principal objections of well known by-pass arrangements, that of passing the accumulated foreign matter through the filter device along with the fluid by-passing the element, is avoided.

While only one embodiment of the invention is shown herein, modifications may be made without departing from the scope of the invention. For example, a bellows of a predetermined resiliency may be used in place of spring 50 for urging the filter element to its seated position or a ring of rubber or rubber-like material may be substituted for the bellows. Further, treated cloth or like material substantially impervious to the fluid being filtered and supported internally by a spring, such as spring 50, or the like, may be used in place of the bellows. The bellows or any substitute therefor may be interposed between the filter element and any fixed surface in the bowl as for example a stationary horizontal partition across the bowl. Other arrangements and modifications will occur to those skilled in the art and may be made to suit requirements.

I claim:

1. A device for filtering fluids comprising a head having an inlet and an outlet conduit, a bowl connecting said inlet and outlet conduits, a filter element in said bowl between said inlet and outlet conduits adapted to seat around said outlet conduit, a flexible impervious cylindrically-shaped member disposed between said filter element and said bowl urging said element to its seat, an inwardly extending flange on said member adjacent said bowl, a means for clamping said flange against said bowl, and an outwardly extending flange having an upturned edge on said member adjacent said filter element, whereby said element may be unseated by fluid pressure to by-pass fluid around the filter element and thereafter returned to operative position.

2. A device for filtering fluids comprising a head having an inlet and an outlet conduit, a bowl connecting said inlet and outlet conduits, projections around the entrance to said outlet conduit extending into said bowl, a hollow filter element in said bowl adapted to seat around the entrance to said outlet conduit, a hollow resilient impervious cylindrically-shaped member disposed between said filter element and said bowl urging said element to its seat, an inwardly extending flange on said member adjacent said bowl, a disc-shaped means for clamping said flange against said bowl, and an outwardly extending flange having an upturned edge on said member for receiving said filter element, whereby said element may be unseated by fluid pressure to by-pass fluid around the filter element and thereafter returned to operative position.

3. A device for filtering fluids comprising a head having an inlet and an outlet conduit, a bowl connecting said inlet and outlet conduits, fingerlike members around the entrance to said outlet conduit extending into said bowl, a hollow filter element in said bowl between said inlet and outlet conduits adapted to seat around said outlet conduit and said fingerlike members, a flexible metal cylinder disposed between said filter element and said bowl urging said element to its seat, an inwardly extending flange on said cylinder adjacent said bowl, a disc-shaped means for clamping said flange against said bowl, and an outwardly extending flange having an upturned edge on said cylinder adjacent said filter element, whereby said element may be unseated by fluid pressure to by-pass fluid around the said element and thereafter returned to operative position.

WALTER KASTEN.

REFERENCES CITED

The following references are of record in the file of this patent:

UNITED STATES PATENTS

| Number | Name | Date |
|---|---|---|
| 2,028,062 | Goldman | Jan. 14, 1936 |
| 2,354,380 | Kasten | June 25, 1944 |

FOREIGN PATENTS

| Number | Country | Date |
|---|---|---|
| 589,458 | Great Britain | June 20, 1947 |